(12) United States Patent
Yoshikawa

(10) Patent No.: US 10,885,936 B2
(45) Date of Patent: Jan. 5, 2021

(54) ACTUATOR BLOCK HAVING DUAL SENSORS FOR DETECTING THE VIBRATION ON MAGNETIC DISK DRIVE

(71) Applicants: Kabushiki Kaisha Toshiba, Tokyo (JP); Toshiba Electronic Devices & Storage Corporation, Tokyo (JP)

(72) Inventor: Norio Yoshikawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/744,558

(22) Filed: Jan. 16, 2020

(65) Prior Publication Data
US 2020/0152231 A1    May 14, 2020

Related U.S. Application Data

(63) Continuation of application No. 15/998,871, filed on Aug. 17, 2018, now Pat. No. 10,566,017.

(30) Foreign Application Priority Data

Mar. 8, 2018    (JP) .................................. 2018-042311

(51) Int. Cl.
| | | |
|---|---|---|
| *G11B 5/55* | (2006.01) | |
| *G11B 5/58* | (2006.01) | |
| *G11B 5/588* | (2006.01) | |

(52) U.S. Cl.
CPC ............ *G11B 5/5582* (2013.01); *G11B 5/553* (2013.01); *G11B 5/5552* (2013.01); *G11B 5/5586* (2013.01); *G11B 5/5591* (2013.01); *G11B 5/58* (2013.01); *G11B 5/588* (2013.01)

(58) Field of Classification Search
None
See application file for complete search history.

(56) References Cited

U.S. PATENT DOCUMENTS

| | | | |
|---|---|---|---|
| 5,818,651 A * | 10/1998 | Nomura | G11B 21/083 360/78.06 |
| 6,064,540 A | 5/2000 | Huang et al. | |
| 6,257,062 B1 * | 7/2001 | Rich | G01P 15/0888 73/514.32 |
| 6,426,545 B1 | 7/2002 | Eichelberger et al. | |
| 6,597,532 B1 * | 7/2003 | Usui | G11B 5/5582 360/99.23 |

(Continued)

FOREIGN PATENT DOCUMENTS

| | | |
|---|---|---|
| CN | 101359478 A | 2/2009 |
| JP | 2002-124049 | 4/2002 |

OTHER PUBLICATIONS

Fu-Ying Huang et al., "Active Damping in HDD Actuator," IEEE Transactions on Magnetics, vol. 37, No. 2, Mar. 2001, pp. 847-849.

*Primary Examiner* — Tan X Dinh
(74) *Attorney, Agent, or Firm* — White & Case LLP

(57) ABSTRACT

According to one embodiment, a magnetic disk device includes an actuator assembly including an actuator block including a rotatable bearing unit, a plurality of heads movably supported by the actuator assembly, a first sensor provided to the actuator block, and a second sensor provided at a position different from the first sensor.

1 Claim, 8 Drawing Sheets

(56) References Cited

U.S. PATENT DOCUMENTS

| | | |
|---|---|---|
| 6,614,613 B1 | 9/2003 | Huang et al. |
| 6,674,600 B1 * | 1/2004 | Codilian .............. G11B 5/5582 360/75 |
| 6,771,454 B2 * | 8/2004 | White .................. G11B 5/4833 360/77.01 |
| 6,914,743 B1 * | 7/2005 | Narayana ............ G11B 5/5582 360/77.02 |
| 7,215,504 B1 | 5/2007 | Bennett |
| 7,495,857 B1 | 2/2009 | Bennett |
| 9,858,955 B1 * | 1/2018 | Cao ...................... G11B 5/5565 |
| 10,566,017 B2 * | 2/2020 | Yoshikawa ............ G11B 5/553 |
| 2002/0135928 A1 | 9/2002 | Aikawa et al. |
| 2003/0103287 A1 * | 6/2003 | Agematsu ................ G11B 5/54 360/60 |
| 2008/0170320 A1 * | 7/2008 | Funabashi ............ G11B 5/5582 360/75 |
| 2009/0034116 A1 | 2/2009 | Higashino et al. |
| 2009/0122438 A1 | 5/2009 | Matsuzawa et al. |
| 2010/0061007 A1 | 3/2010 | Matsushita et al. |
| 2013/0194691 A1 | 8/2013 | Hara et al. |
| 2019/0279672 A1 * | 9/2019 | Yoshikawa .......... G11B 5/5526 |
| 2020/0152231 A1 * | 5/2020 | Yoshikawa .......... G11B 5/5582 |

* cited by examiner

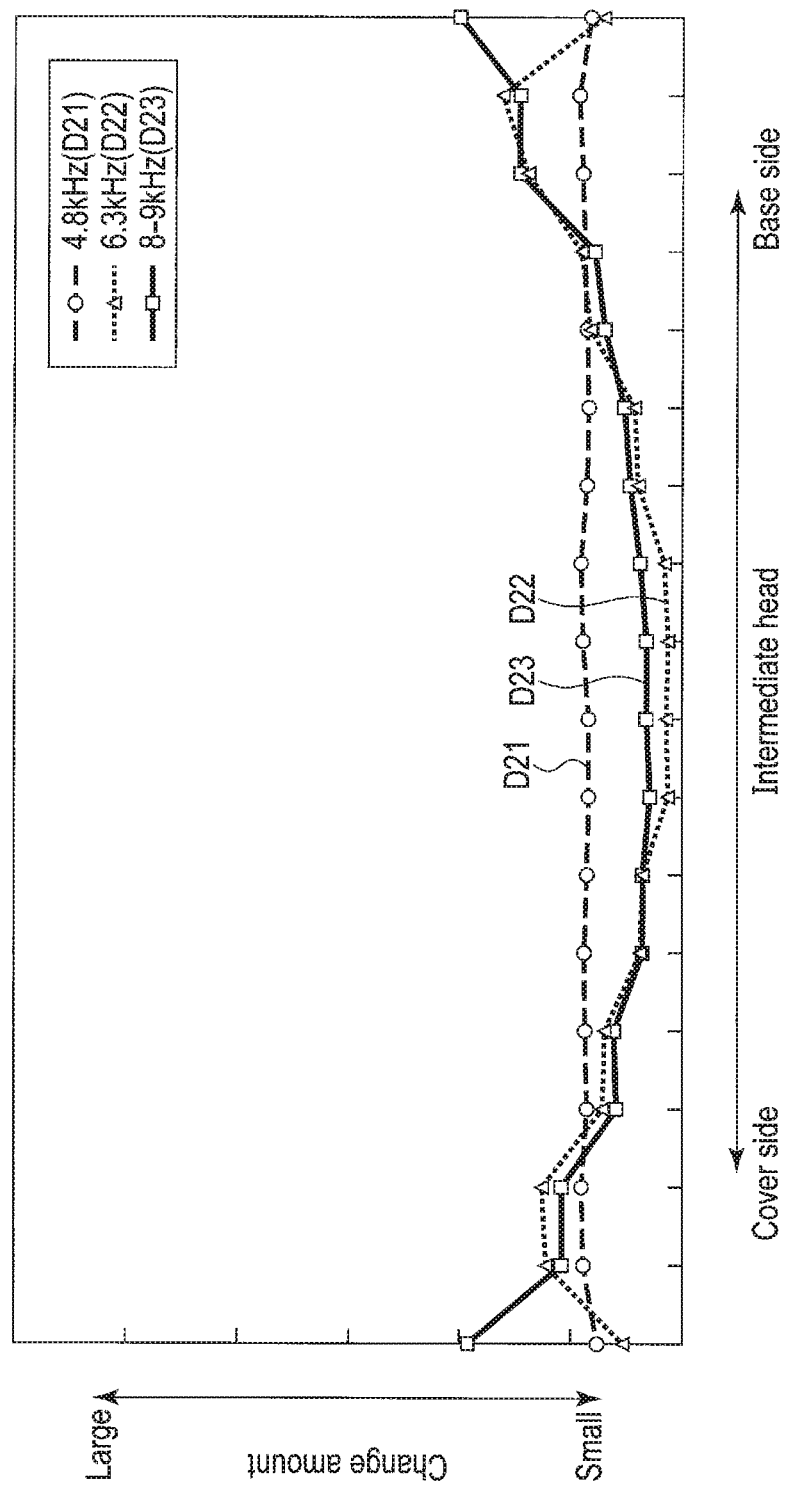
F I G. 2

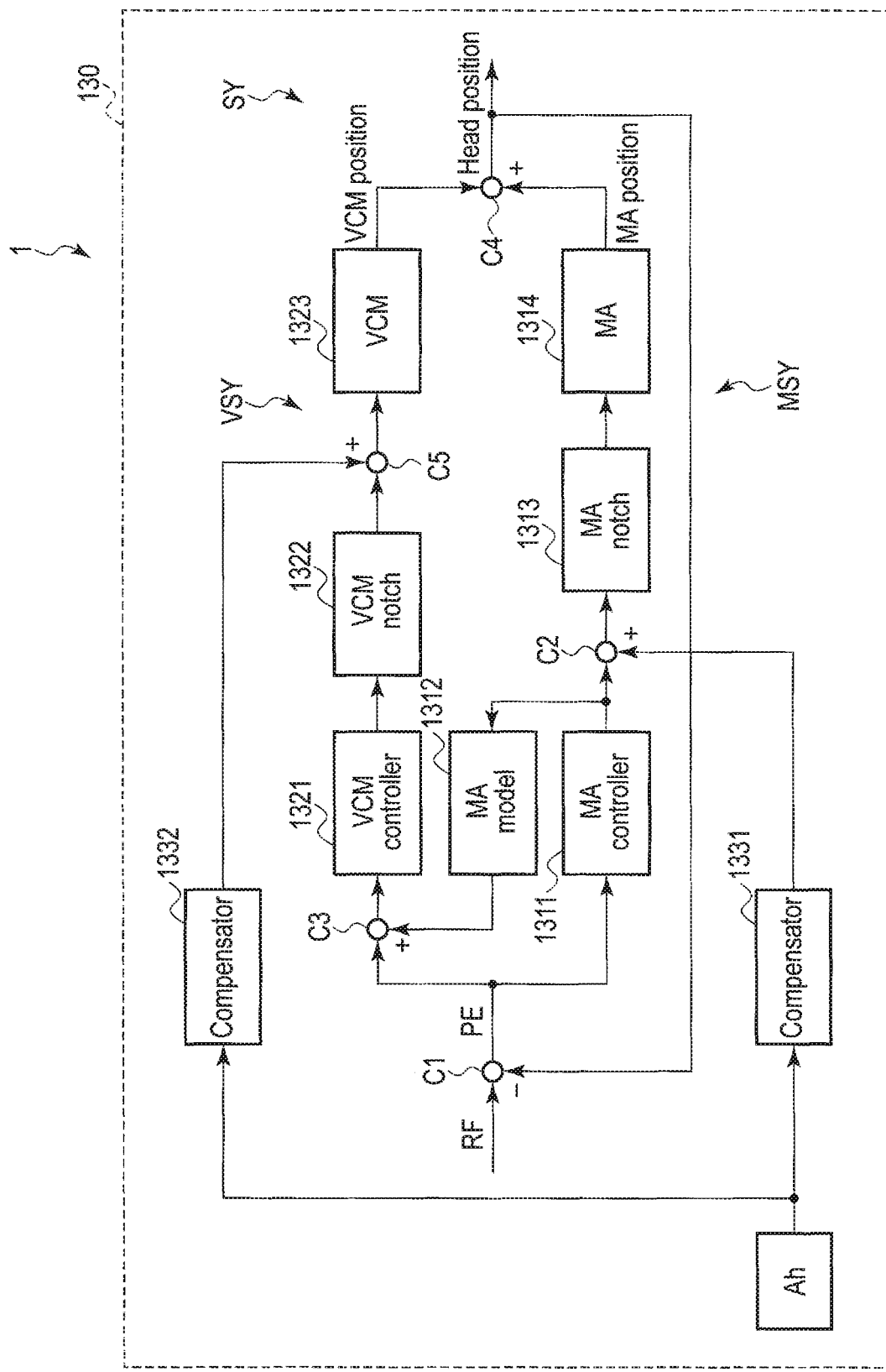
F I G. 8

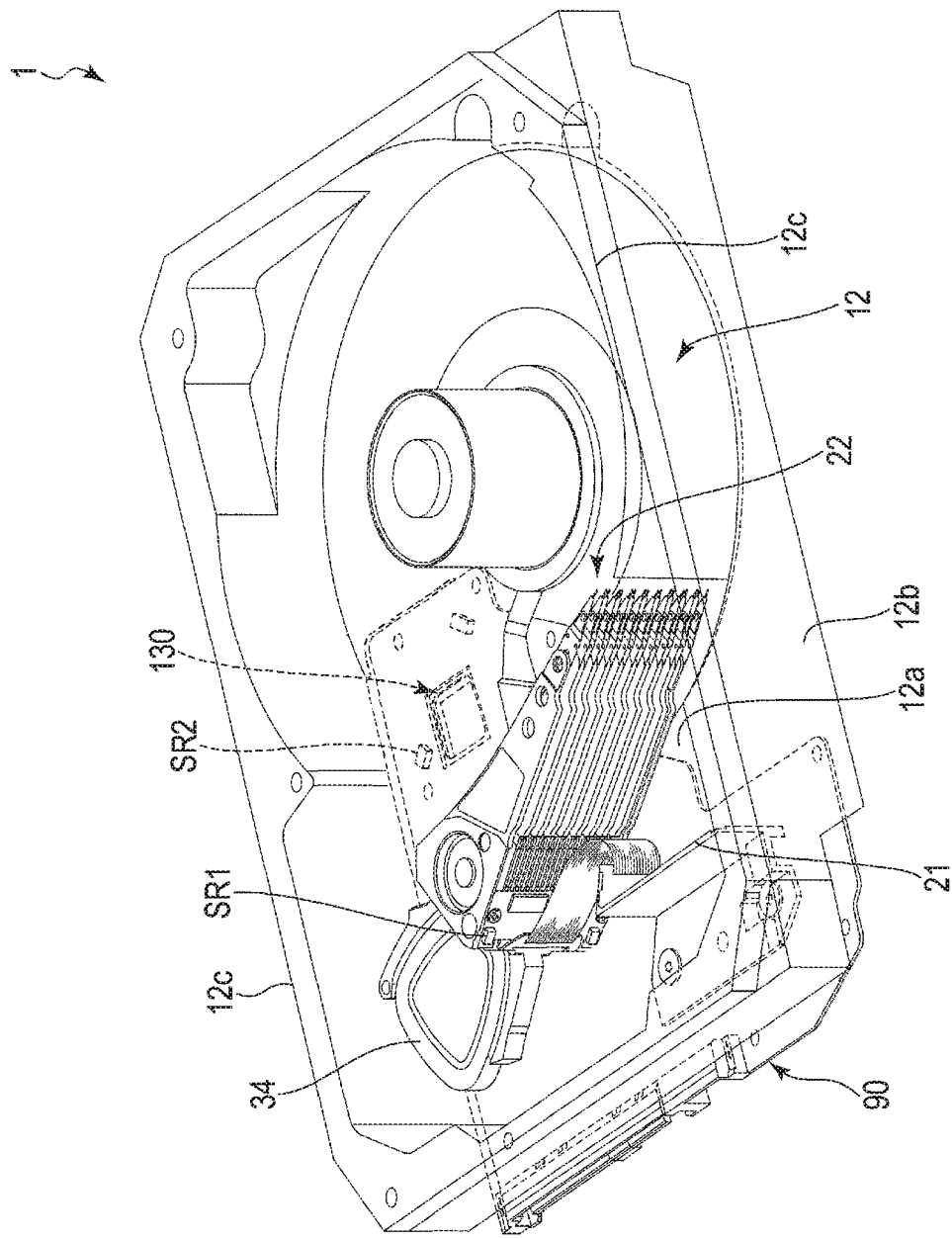
F I G. 9

ACTUATOR BLOCK HAVING DUAL SENSORS FOR DETECTING THE VIBRATION ON MAGNETIC DISK DRIVE

CROSS-REFERENCE TO RELATED APPLICATIONS

This application is a continuation of application Ser. No. 15/998,871 filed Aug. 17, 2018 and is based upon and claims the benefit of priority from Japanese Patent Application No. 2018-042311, filed Mar. 8, 2018, the entire contents of which are incorporated herein by reference.

FIELD

Embodiments described herein relate generally to a magnetic disk device.

BACKGROUND

A magnetic disk device such as a hard disk drive (HDD) generally includes magnetic disks which are disposed inside a housing, a spindle motor which supports, and drives and rotates the magnetic disks, an actuator assembly which supports magnetic heads, a voice coil motor which drives this actuator assembly, and a printed circuit board.

The magnetic disk device vibrates due to a disturbance such as a sound pressure produced by a fan installed outside. When the magnetic disk device vibrates in this way, a positioning error of each magnetic head mounted on the actuator assembly is likely to become significant.

BRIEF DESCRIPTION OF THE DRAWINGS

FIG. 2 is a view illustrating an example of a change amount of a positioning error of each head in a case where the magnetic disk device vibrates at the respective frequencies;

FIG. 8 is a view illustrating an example of a positioning control system of heads according to a modified example; and FIG. 9 is a schematic view illustrating an example of a magnetic disk device according to a second embodiment.

DETAILED DESCRIPTION

In general, according to one embodiment, a magnetic disk device comprises: an actuator assembly including an actuator block including a rotatable bearing unit; a plurality of heads movably supported by the actuator assembly; a first sensor provided to the actuator block; and a second sensor provided at a position different from the first sensor.

Embodiments will be described below with reference to the drawings. In addition, the drawings are exemplary, and by no means limit the scope of the invention.

First Embodiment

Figure 1:
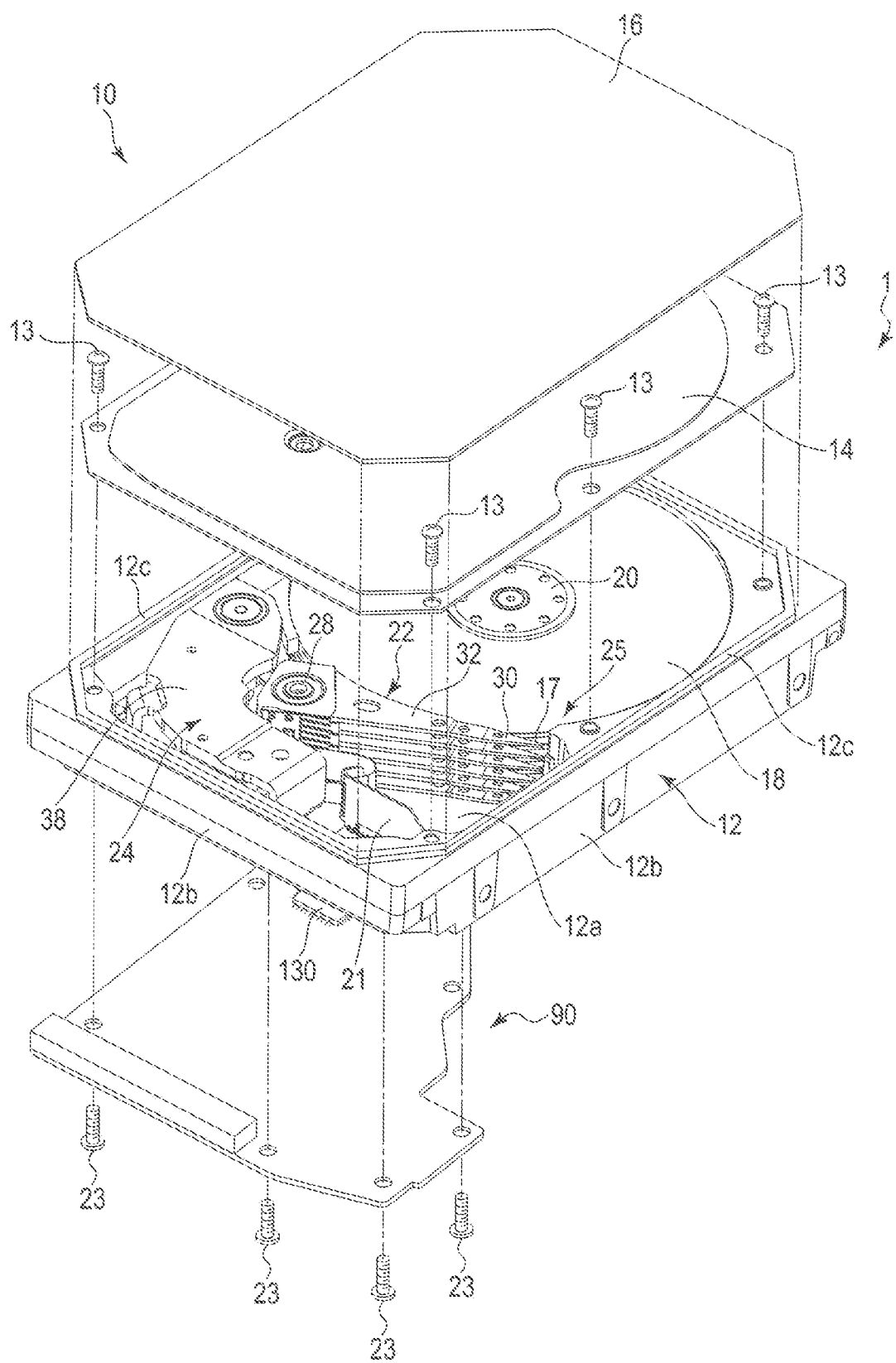
FIG. 1 is an exploded perspective view illustrating an internal structure of a magnetic disk device according to a first embodiment.

FIG. 1 is an exploded perspective view illustrating an internal structure of a magnetic disk device 1 according to the first embodiment.

The magnetic disk device 1 has a substantially rectangular housing 10. The housing 10 includes a rectangular box-shaped base 12 whose upper surface is opened, an inner cover 14 which is screwed to the base 12 by a plurality of screws 13, and blocks an upper end opening of the base 12, and an outer cover (top cover) 16 which is overlaid and disposed on the inner cover 14 and whose periphery portion is welded to the base 12. A direction which travels toward the base 12 will be referred to as a lower side (or simply referred to as a downward direction), and a direction which travels toward the inner cover 14 and the outer cover (top cover) 16 will be referred to as an upper side (or simply as an upward direction). The base 12 includes a rectangular bottom wall 12a which faces the inner cover 14 with a gap interposed therebetween, and a sidewall 12b which is provided vertically along a periphery of the bottom wall 12a. The base 12 is integrally molded by using, for example, aluminum. The sidewall 12b includes a pair of long side walls facing each other, and a pair of short side walls facing each other. A substantially rectangular frame-shaped fixing rib 12c is provided protruding from an upper end surface of the sidewall 12b.

The inner cover 14 is formed in a rectangular plate shape by using, for example, stainless steel. A periphery portion of the inner cover 14 is screwed to an upper surface of the sidewall 12b of the base 12 by the screws 13, so that the inner cover 14 is fixed to an inner side of the fixing rib 12c. The outer cover 16 is formed in a rectangular plate shape by using, for example, aluminum. The outer cover 16 is formed in a planar dimension slightly larger than the inner cover 14. The entire periphery portion of the outer cover 16 is welded and fixed airtight to the fixing rib 12c of the base 12.

In the housing 10, a plurality of recording media such as five to nine magnetic disks (simply referred to as disks below) 18, and a spindle motor 20 which is a driving unit which supports and the rotates the disks 18 are provided. The spindle motor 20 is disposed on the bottom wall 12a. Each disk 18 includes magnetic recording layers on an upper surface and/or a lower surface of each disk 18. Each disk 18 is coaxially fitted to an unillustrated hub of the spindle motor 20, is clamped by a clamp spring and is fixed to the hub. Thus, each disk 18 is supported in a state where each disk 18 is located in parallel to the bottom wall 12a of the base 12. Each disk 18 is rotated at a particular rotational speed by the spindle motor 20.

In addition, in the present embodiment, the five to nine disks 18 are housed in the housing 10. However, the number of disks 18 is not limited to this. Furthermore, the single disk 18 may be housed in the housing 10.

In the housing 10, a plurality of magnetic heads (simply referred to as heads below) 17 which writes and reads information in the disks 18, and an actuator assembly (actuator) 22 which supports these heads 17 movably with respect to the disks 18 are provided. Furthermore, in the housing 10, a voice coil motor (referred to as a "VCM"

below) 24 which controls an operation such as rotation and positioning of the actuator assembly 22, a ramp load mechanism 25 which holds the head 17 at an unload position apart from the disk 18 when the head 17 moves to the outermost circumference of the disk 18, and a board unit (wiring member) 21 are provided. The board unit 21 includes a flexible printed wiring board (FPC). This FPC is electrically connected with the heads 17 and a voice coil 34 of the VCM 24 described below via a relay FPC on the actuator assembly 22.

The actuator assembly 22 includes a rotatable bearing unit 28, a plurality of arms 32 which extends from the bearing unit 28, and a suspension assembly (suspension) 30 which extends from each arm 32. Each head 17 is supported at a distal end portion of each suspension assembly 30. The actuator assembly 22 is driven by the VCM 24 to move the head 17 to a particular position of the disk 18.

A printed circuit board (a control circuit board) 90 is screwed to an outer surface (a bottom surface) of the bottom wall 12a of the base 12 by a plurality of screws 23. The control circuit board 90 faces the bottom wall 12a of the base 12 with a slight gap interposed therebetween. An unillustrated insulation sheet which is an insulation member is disposed between an outer surface of the bottom wall 12a of the base 12 and the control circuit board 90. Electronic parts such as a semiconductor chip and a control unit (a controller) 130 are mounted on an inner surface (a surface on a side facing the base 12) of the control circuit board 90. The control circuit board 90 includes an unillustrated connector. This connector is electrically connected with the FPC unit 21. The control unit 130 controls an operation of the spindle motor 20, and controls operations of the VCM 24 and the heads 17 via the board unit 21.

FIG. 2 is a view illustrating an example of a change amount of a positioning error of each head 17 in a case where the magnetic disk device 1 vibrates at each frequency. FIG. 2 illustrates an increase amount (referred to as the change amount below) of the positioning error of each head 17 in a case where the magnetic disk device 1 such as the housing 10 vibrates due to a disturbance. In FIG. 2, a vertical axis indicates the change amount, and a horizontal axis indicates each head 17 from the side of the inner cover 14 (referred to as a cover side below) to a side of the bottom wall 12a (referred to as a base side below). FIG. 2 illustrates an increase (deterioration) of the positioning error of each head 17 as the change amount becomes greater. In a region in which the actuator assembly 22 supports a plurality of heads 17, a cover side region will be simply referred to as a cover region, a base side region will be referred to as a base region, and a region between the cover region and the base region will be referred to as an intermediate region. Furthermore, the heads 17 located in the cover region will be referred to as the cover side heads 17, the heads 17 located in the base region will be referred to as base side heads, and the heads 17 located in the intermediate region will be referred to as the intermediate heads 17. Due to a disturbance such as a sound pressure of a fan for cooling a CPU of a server, the magnetic disk device 1 (e.g., housing 10) vibrates at a frequency of 4 to 9 kHz. FIG. 2 illustrates, for example, a distribution D21 of the change amount of the positioning error (referred to as a distribution of a change amount at 4.8 kHz below) from the cover side heads 17 to the base side heads 17 in a case where the magnetic disk device 1 vibrates at a frequency of 4.8 kHz. Furthermore, FIG. 2 illustrates a distribution D22 of the change amount of the positioning error (referred to as a distribution of a change amount at 6.3 kHz below) from the cover side heads 17 to the base side heads 17 in a case where the magnetic disk device 1 vibrates at a frequency of 6.3 kHz. Furthermore, FIG. 2 illustrates a distribution D23 of the change amount of the positioning error (referred to as a distribution of a change amount at 8 to 9 kHz below) from the cover side heads 17 to the base side heads 17 in a case where the magnetic disk device 1 vibrates at a frequency of 8 to 9 kHz.

The distribution D21 of the change amount at 4.8 kHz indicates that, when the magnetic disk device 1 vibrates at the frequency of 4.8 kHz, the change amount of each head 17 from the cover side heads 17 to the base side heads 17 is a substantially fixed amount. The distribution D22 of the change amount at 6.3 kHz and the distribution D23 of the change amount at 8 to 9 kHz indicate that, when the magnetic disk device 1 vibrates at the frequencies of 6.3 kHz and 8 to 9 kHz, the change amounts of the cover side heads 17 and the base side heads 17 are larger than the change amounts of the intermediate heads 17. The change amounts of the heads 17 of the cover side heads 17 and the base side heads 17 in the case where the magnetic disk device 1 vibrates at the frequencies of 6.3 kHz and 8 to 9 kHz are larger than the change amounts of the cover side heads 17 and the base side heads 17 in the case where the magnetic disk device 1 vibrates at the frequency of 4.8 kHz. The change amounts of the intermediate heads 17 in the case where the magnetic disk device 1 vibrates at the frequencies of 6.3 kHz and 8 to 9 kHz are larger than the change amounts of the intermediate heads 17 in the case where the magnetic disk device 1 vibrates at the frequency of 4.8 kHz.

Figure 3:
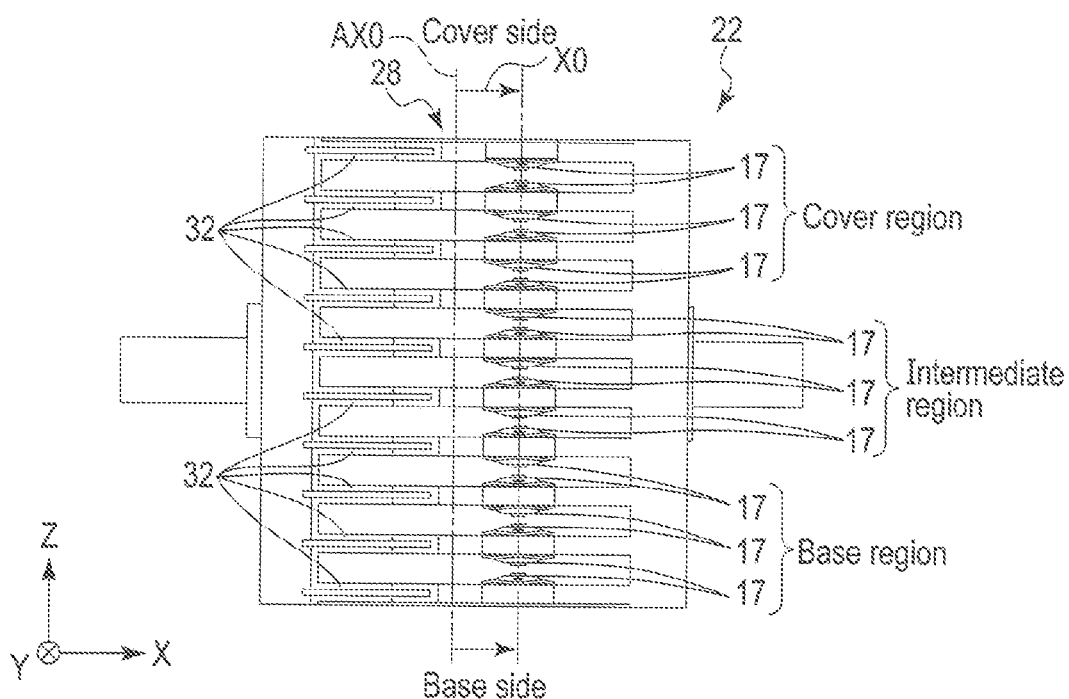
FIG. 3 is a schematic view illustrating an example of an actuator assembly in a case where the magnetic disk device vibrates at 4.8 kHz in the frequency illustrated in FIG. 2.

FIG. 3 is a schematic view illustrating an example of the actuator assembly 22 in the case where the magnetic disk device 1 vibrates at the frequency of 4.8 kHz illustrated in FIG. 2. FIG. 3 illustrates the actuator assembly 22 seen from the head 17 side. FIG. 3 illustrates only components necessary for description. In FIG. 3, a first direction X, a second direction Z and a third direction Y are perpendicular to each other, yet may intersect in a state other than a perpendicular state. Hereinafter, a direction toward a tip of an arrow indicating the first direction X will be referred to as a right side (or simply referred to as a right), and a direction from the tip of the arrow indicating the first direction X toward the other side will be referred to as a left side (or simply referred to as a left) The first direction X corresponds to a moving direction (hereinafter, also referred to as a movement direction or a translation direction) of each head 17. In the second direction Z, a direction toward a tip of an arrow indicating the second direction Z is upward, and a direction from the tip of the arrow indicating the second direction to the other side is downward. In addition, a length of an object in the second direction Z may also be referred to as a thickness or a height, and the second direction Z may be referred to as a thickness direction or a height direction.

As illustrated in FIG. 3, the plurality of heads 17 in the actuator assembly 22 are aligned at intervals in the second direction Z. When the magnetic disk device 1 vibrates at 4.8 kHz in the frequency, each head 17 vibrates in the first direction X. In this case, substantially the same acceleration in the first direction X is applied to each head 17. Hence, each head 17 is shifted by substantially the same distance in the first direction X with respect to an axis (referred to as a reference axis below) AX0 passing on the bearing unit 28. The reference axis AX0 corresponds to, for example, a rotation axis of the actuator assembly 22. The reference axis AX0 extends in, for example, the second direction Z, and is substantially perpendicular to the bottom wall 12a. In the example illustrated in FIG. 3, an acceleration in a rightward direction is applied to each head 17. Hence, each head 17 is shifted rightward by substantially the same distance X0 from the reference axis AX0.

Figure 4:
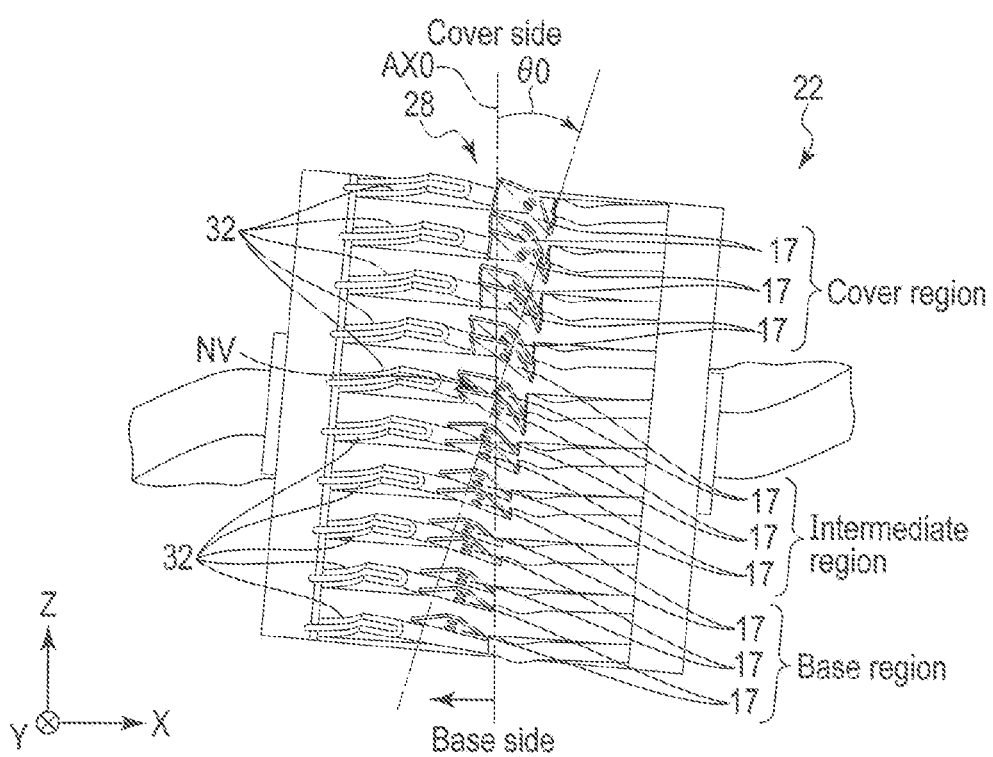
FIG. 4 is a schematic view illustrating an example of the actuator assembly in a case where the magnetic disk device vibrates at 6.3 kHz or more in the frequency illustrated in FIG. 2.

FIG. 4 is a schematic view illustrating an example of the actuator assembly 22 in a case where the magnetic disk device 1 vibrates at 6.3 kHz or more and 9 kHz or less in the frequency illustrated in FIG. 2. FIG. 4 illustrates only components necessary for description.

When the magnetic disk device 1 vibrates at 6.3 kHz or more and 9 kHz or less in the frequency, each head 17 vibrates twisting from a node of vibration NV of the actuator assembly 22 as a base point. In this regard, the node of vibration NV includes not only a portion which does not vibrate and whose amplitude is 0, but also a portion which hardly vibrates and whose amplitude is little. In this case, an acceleration and an angular acceleration are applied to each head 17. Hence, each head 17 rotates about the node NV as the base point on an X-Z plane. In the example illustrated in FIG. 4, a rightward acceleration and a clockwise angular velocity are applied to each head 17. Hence, each head rotates at an angle θ0 about the node of vibration NV as the base point located on the reference axis AX0 on the X-Z plane. As illustrated in FIG. 4, the cover side heads 17 and the base side heads 17 are distant from the node NV and therefore significantly fluctuate, and the intermediate heads 17 are at a close distance to the node NV and therefore fluctuate little.

Figure 5:
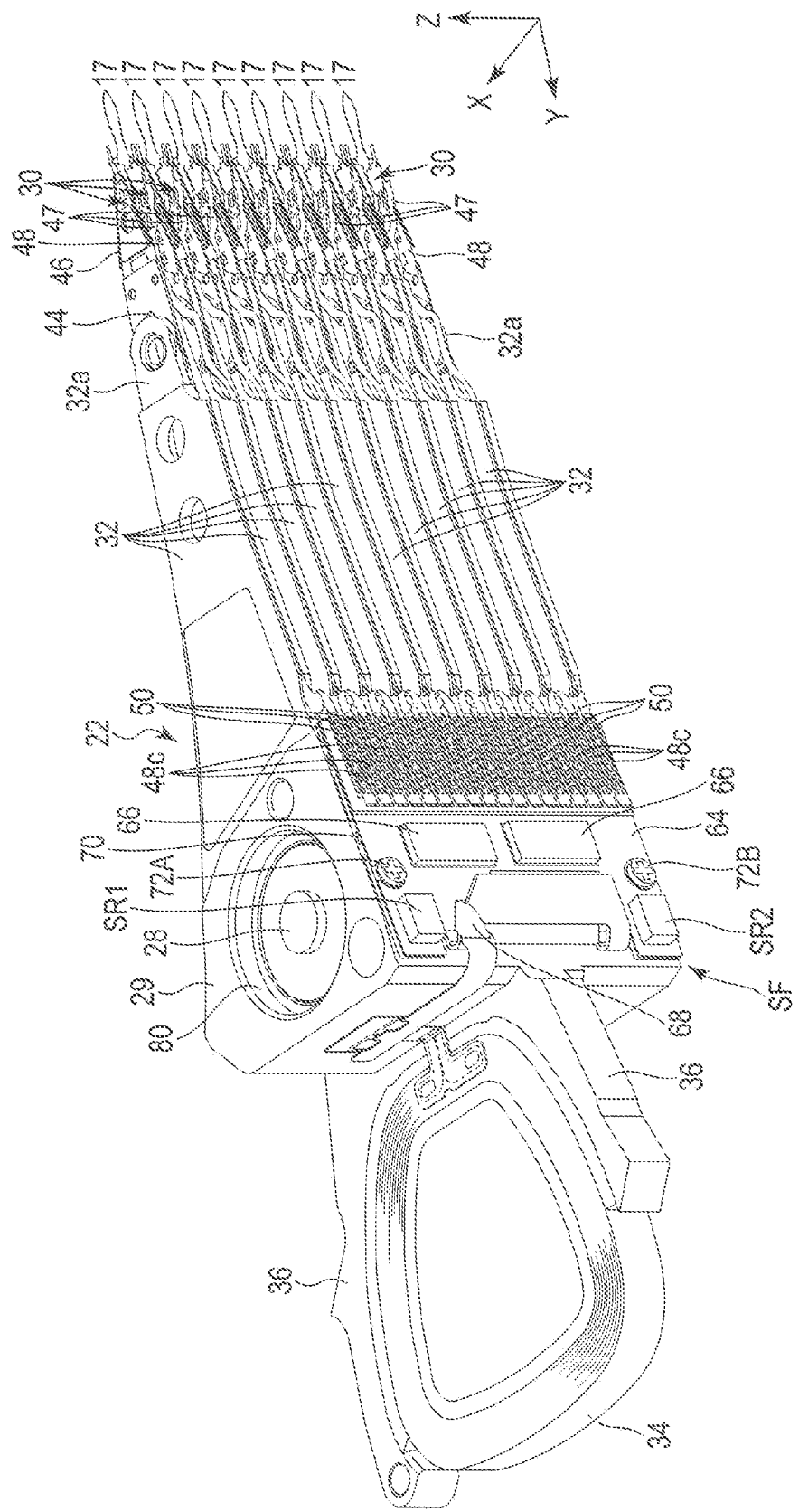
FIG. 5 is a perspective view illustrating the actuator assembly from one surface side.

FIG. 5 is a perspective view illustrating the actuator assembly 22 from one surface side.

As illustrated in FIG. 5, the actuator assembly 22 includes an actuator block 29 which includes a through-hole 80, the rotatable bearing unit (unit bearing) 28 which is provided in the through-hole 80, a plurality of arms 32 such as the 10 arms 32 which extend from the actuator block 29 in the third direction (also referred to as an extension direction below) Y, and the suspension assembly 30 which is attached to each arm 32. Each head 17 is supported by each suspension assembly 30 of the actuator assembly 22. The bearing unit 28 includes a pivot which is vertically provided on the bottom wall 12a of the base 12 near an outer periphery of each disk 18, a plurality of bearings which is attached to the pivot, and spacers which are disposed between a plurality of bearings. A plurality of bearings of the bearing unit 28 is fitted in the through-hole 80 of the actuator block 29, and is further fixed to the actuator block 29 by an adhesive injected in the through-hole 80 or by an unillustrated screws. Thus, the actuator assembly 22 is supported on the bottom wall 12a turnably about the pivot of the bearing unit 28 such as the reference axis AX0 passing on the pivot.

In the present embodiment, the actuator block 29 and the 10 arms 32 are formed integrally with each other using aluminum, or the like, to constitute a so-called E block. Each arm 32 is formed in, for example, a thin flat plate shape, and extends from the actuator block 29 toward the third direction Y orthogonal to the pivot of the bearing unit 28. The 10 arms 32 are aligned in the second direction Z and provided in parallel with gaps interposed therebetween.

The actuator assembly 22 includes a support frame 36 which extends from the actuator block 29 to a direction opposite to the arms 32. This support frame 36 supports the voice coil 34 which constitutes part of the VCM 24. As illustrated in FIG. 1, the voice coil 34 is located between a pair of yokes 38 one of which is fixed on the base 12 and constitutes the VCM 24 together with these yokes 38 and a magnet fixed to one of the yokes.

The actuator assembly 22 includes the 18 suspension assemblies 30 which respectively support the heads 17. These suspension assemblies 30 are attached to extended ends 32a of the respective arms 32. A plurality of suspension assemblies 30 includes up-head suspension assemblies which support the heads 17 upward, and down-head suspension assemblies which support the heads 17 downward. The up-head suspension assemblies and the down-head suspension assemblies are configured by disposing the suspension assemblies 30 having the same structure so that upward and downward directions of the suspension assemblies 30 are changed.

The suspension assembly 30 includes a substantially rectangular base plate 44, a load beam 46 which is formed by a thin and long leaf spring, a pair of piezoelectric elements (PZT elements) 47, and a thin and long belt-like flexure (wiring member) 48 which transmits a write signal, a read signal and a drive signal of the piezoelectric elements 47. A base end portion of the base plate 44 is fixed to the extended end 32a of the arm 32, and is caulked, for example. A base end portion of the load beam 46 is overlaid on and fixed to an end portion of the base plate 44. The load beam 46 is formed to extend from the base plate 44, and taper toward the extended end. The base plate 44 and the load beam 46 are formed by using, for example, stainless steel. The piezoelectric elements 47 operate to stretch and contract to finely control an operation of the head 17. Hereinafter, a configuration of finely controlling each head 17 including a control system which controls the piezoelectric elements 47, the piezoelectric elements 47 and wires which connect this control system and the piezoelectric elements, i.e., for example, a configuration of more finely controlling positioning than control performed by the VCM 24 will be referred to as a microactuator (MA) in some cases.

The flexure 48 includes a metal plate (backing layer) such as stainless steel which serves as a base, an insulation layer which is formed on this metal plate, a conductive layer which constitutes a plurality of wires (wiring pattern) formed on the insulation layer, and a protective layer (insulation layer) which covers the conductive layer, and is a thin and long belt-like laminated plate.

The flexure 48 includes a distal end side portion which is attached onto surfaces of the load beam 46 and the base plate 44, and a base end side portion which extends outward from a side edge of the base plate 44 and extends to a base end portion (actuator block 29) of the arm 32 along the side edge of the base plate 44 and the arm 32. A distal end portion of the flexure 48 located on the load beam 46 is provided with a deformable gimbal portion (elastic support portion). The head 17 is mounted on this gimbal portion. A wire of the flexure 48 is electrically connected with the head 17.

The base end side portion of the flexure 48 extends outward from the side edge of the base plate 44, and then extends to the base end of the arm 32 along this side edge and one side edge of the arm 32. A connection end portion 48c of the flexure 48 is formed at one end of the base end side portion. The connection end portion 48c is formed in a thin and long rectangular shape. The connection end portion 48c is bent at a right angle with respect to the base end side portion, and is located substantially vertically with respect to the arm 32. A plurality of connection terminals (connection pads) 50 is aligned in a row on the connection end portion 48c. These connection terminals 50 are respectively connected with the wires of the flexure 48. That is, a plurality of wires of the flexure 48 extends over the substantially entire length of the flexure 48, and has one ends electrically connected with the head 17 and the other ends connected with the connection terminals (connection pads) 50 of the connection end portion 48c.

A bonding portion 64 is formed by the flexible printed circuit board. The flexible printed circuit board includes an insulation layer such as polyimide, a conductive layer which is formed on this insulation layer and forms a wire, and a protective layer which covers the conductive layer. The bonding portion 64 is formed in a rectangular shape having a substantially equal width as the height (thickness) of the actuator block 29. The bonding portion 64 includes a plurality of connection pad groups meeting the connection end portions 48c of the flexures 48. Head ICs (head amplifiers) 66 and sensors SR1 and SR2 are mounted on the bonding portion 64. The head ICs 66, the sensor SR1 and the sensor SR2 are connected to the connection pad groups and the board unit 21 via the wires. Furthermore, the bonding portion 64 includes a connection pad 68 for connecting with the voice coil 34. For example, a backing plate 70 made of aluminum is pasted as a reinforcing plate to an inner surface (back surface) of the bonding portion 64. This backing plate 70 is formed having substantially the same shape and dimension as those of the bonding portion 64, and is pasted on substantially the entire surface of the bonding portion 64.

The bonding portion 64 formed in this way is pasted on one side surface (installation surface) SF on which the backing plate 70 side widens in the second direction Z and the third direction Y of the actuator block 29, and is screwed and fixed to the installation surface by two fixing screws 72A and 72B. The two fixing screws 72A and 72B are located near the sensor SR1 and the sensor SR2, respectively. In the illustrated example, the fixing screw 72A is located between the sensor SR1 and the connection end portion 48c in the third direction Y. The fixing screw 72B is located between the sensor SR2 and the connection end portion 48c in the third direction Y. In other words, the sensor SR1 is located between the voice coil 34 and the fixing screw 72A in the third direction Y. The sensor SR2 is located between the voice coil 34 and the fixing screw 72B in the third direction Y. The connection end portions 48c of each flexure 48 are led toward the installation surface of the actuator block 29, and bonded to the bonding portion 64. Furthermore, a connection pad 68 of the bonding portion 64 is connected with the wire of the voice coil 34.

Thus, each of the 18 heads 17 is connected to the control circuit board 90 via the wires of the flexures 48, the connection end portions 48c and the FPC unit 21.

In a state where the actuator assembly 22 formed in this way is assembled on the base 12 as illustrated in FIG. 1, the bearing unit 28 has a lower end portion of the pivot fixed to the base 12, and is provided vertically in substantially parallel to the spindle of the spindle motor 20. Each disk 18 is located between the two suspension assemblies 30. During an operation of an HDD, the head 17 attached to the suspension assembly 30 faces an upper surface and a lower surface of the disk 18. The FPC unit 21 is fixed to the bottom wall 12a of the base 12.

Figure 6:
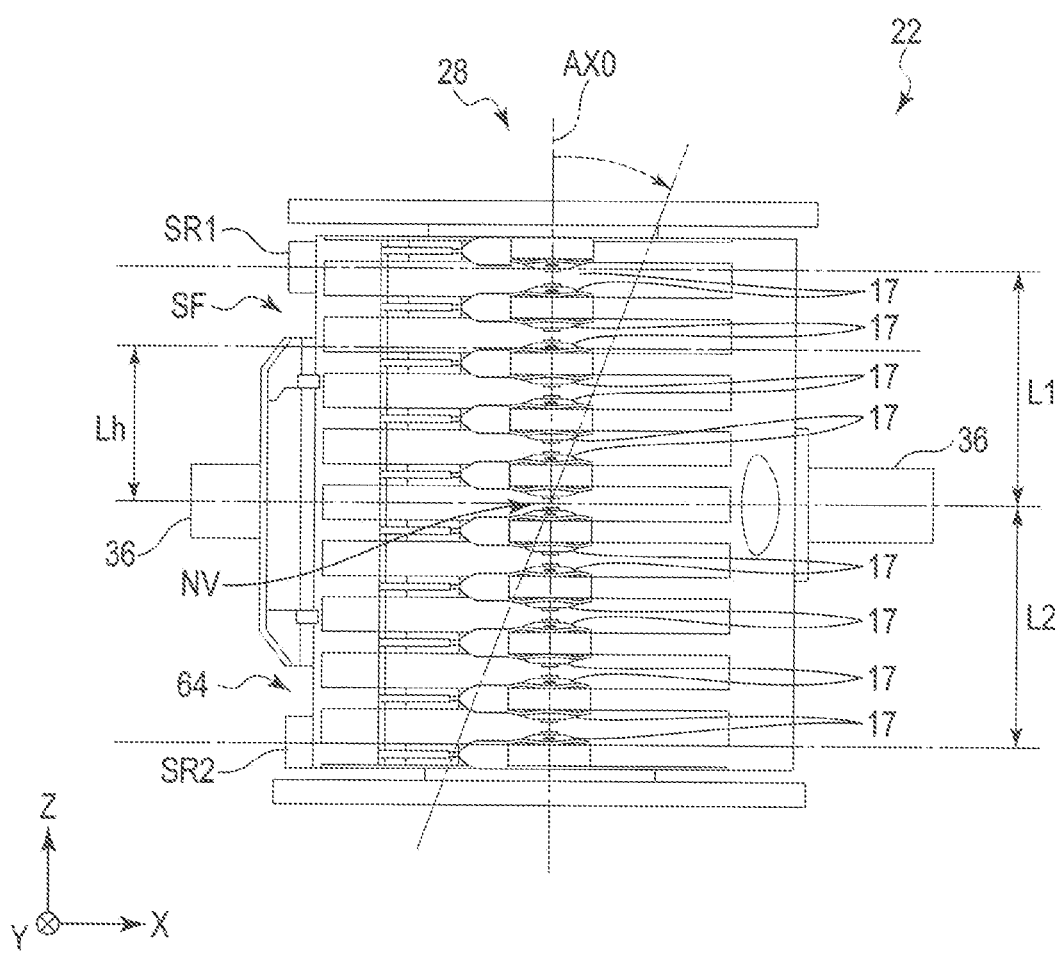
FIG. 6 is a schematic view illustrating an example of a method for estimating an acceleration of a particular head in a case where the magnetic disk device is vibrating at a specific frequency due to a disturbance.

FIG. 6 is a schematic view illustrating an example of a method for estimating an acceleration of the particular head 17 in a case where the magnetic disk device 1 is vibrating at a specific frequency due to a disturbance. FIG. 6 illustrates only components necessary for description. FIG. 6 illustrates a distance L1 in the second direction Z between the node NV and the sensor SR1, a distance L2 in the second direction Z between the node NV and the sensor SR2, and a distance Lh in the second direction Z between the node NV and the particular head 17 such as the head 17 which executes read or write processing among a plurality of heads 17.

The sensors SR1 and SR2 are acceleration sensors which detect an acceleration. In addition, one of the sensors SR1 and SR2 may be the acceleration sensor, and the other one may be an angular acceleration sensor. The sensor SR1 is located in the second direction Z and in a direction opposite to the sensor SR2 with respect to the node NV. The node NV is detected by analysis, and is located at an intermediate position of the thickness of the actuator block 29. In the example illustrated in FIG. 6, the sensor SR1 is located at an upper end portion of the bonding portion 64 pasted on the one side surface SF of the actuator block 29. The sensor SR2 is located at a lower end portion of the bonding portion 64 pasted on the one side surface SF of the actuator block 29. The sensor SR1 and the sensor SR2 are desirably located at the same distance from the node NV. In other words, the distance L1 and the distance L2 are desirably the same. In addition, the distance L1 and the distance L2 may be different. The sensor SR1 may be located in the second direction Z and at a portion between the upper end portion of the bonding portion 64 and the position corresponding to the node NV of the bonding portion 64. The sensor SR2 may be located in the second direction Z and at a portion between the lower end portion of the bonding portion 64 and the portion corresponding to the node NV of the bonding portion 64. As long as at least one of the sensor SR1 and the sensor SR2 is disposed in the actuator block 29, the other one may be disposed anywhere. Furthermore, as long as the sensors SR1 and SR2 are disposed at portions at which resonance modes other than a disturbance such as a sound pressure hardly occur, the sensors SR1 and SR2 may be disposed at other portions.

In an example illustrated in FIG. 6, an estimated acceleration Ah in the first direction X of the particular head 17 in a case where the magnetic disk device 1 is vibrating at a particular frequency due to a disturbance is expressed by the following equations.

$$Ah1 = 1/(Lz1+Lz2) \times (Lz2 \times A1 + Lz1 \times A2) \qquad \text{Equation (1)}$$

$$Ah2 = Lh \times (A1-A2)/(L1+L2) \qquad \text{Equation (2)}$$

$$Ah = Ah1 + Ah2 \qquad \text{Equation (3)}$$

In this regard, A1 represents an acceleration detected by the sensor SR1, and A2 represents an acceleration detected by the sensor SR2. Furthermore, Lh represents a distance in the Z direction of the head 17 from a rotation center (CG).

According to Equation (1) to Equation (3), the particular head 17 such as the head 17 which is executing read processing or write processing can calculate the estimated acceleration Ah.

Figure 7:
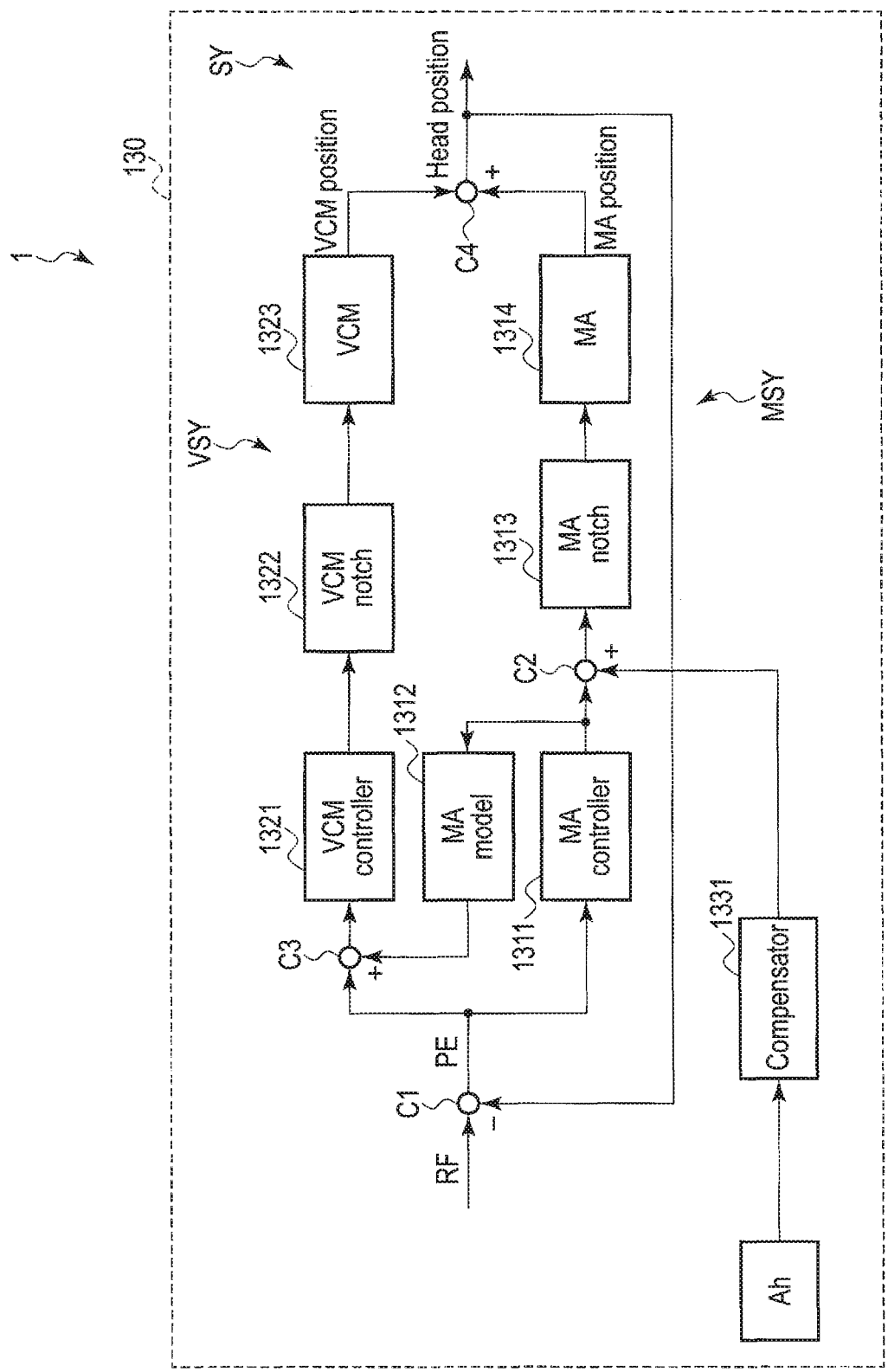
FIG. 7 is a view illustrating an example of a positioning control system of heads according to a first embodiment.

FIG. 7 is a view illustrating an example of a positioning control system SY of the heads 17 according to the first embodiment.

The control unit 130 is electrically connected to the sensor SR1 and the sensor SR2 via the board unit 21, for example. The control unit 130 calculates the estimated acceleration Ah of the particular head 17 such as the head 17 which is executing read processing or write processing based on the accelerations A1 and A2 detected by the sensor SR1 and the sensor SR2 and above Equation (1) to Equation (3). The control unit 130 includes the positioning control system SY which positions the heads 17.

The positioning control system SY includes an MA controller 1311, an MA model 1312, an MA notch 1313, an MA 1314, a VCM controller 1321, a VCM notch 1322, a VCM 1323, a compensator 1331, a manipulated variable C1, a manipulated variable C2, a manipulated variable C3 and a manipulated variable C4. Hereinafter, in the positioning control system SY, a control system of the VCM 24 will be referred to as a VCM control system VSY, and a control system of the MA will be referred to as an MA control system in some cases. The VCM control system VSY includes, for example, the VCM controller 1321, the VCM notch 1322 and the VCM 1323. The MA control system MSY includes, for example, the MA controller 1311, the MA model 1312, the MA notch 1313 and the MA 1314. The positioning control system SY performs feed-forward input of the estimated acceleration Ah to the MA control system MSY such as the manipulated variable C2 between the MA controller 1311 and the MA notch 1313.

The MA controller 1311 generates a signal (referred to as an MA control signal below) corresponding to a control amount for controlling the MA based on a position error signal (PES) PE.

The MA model 1312 generates a signal (referred to as an estimated MA drive signal below) corresponding to a next MA drive amount estimated based on the MA control signal.

The MA notch 1313 suppresses resonance characteristics, and generates a signal (referred to as an MA drive signal below) corresponding to the drive amount for actually driving the MA.

The MA 1314 is driven based on the MA drive amount.

The VCM controller 1321 generates a signal (referred to as a VCM control signal below) corresponding to a control amount for controlling the VCM 24 based on the position error signal PE and the estimated MA drive signal.

The VCM notch 1322 suppresses resonance characteristics, and generates a signal (referred to as a VCM drive signal below) corresponding to the drive amount for actually driving the VCM 24.

The VCM 1323 is driven based on the VCM drive signal.

The compensator 1331 generates a signal (referred to as an estimated acceleration signal below) obtained by cutting a low frequency component and a high frequency component of the calculated estimated acceleration Ah, and an amplitude component of the operation of the actuator assembly 22 (or the VCM 24). The compensator 1331 includes, for example, a filter which cuts the low frequency component and the high frequency component of the calculated estimated acceleration Ah, and the amplitude component of the operation of the actuator assembly 22 (or the VCM 24), a double integrator and a constant. The filter is, for example, a bandpass filter, and cuts the low frequency component equal to or less than 1 kHz or 2 kHz, the high frequency component equal to or more than 10 kHz and the amplitude component of the operation of the actuator assembly 22.

When the control unit 130 designates a target position of the disk 18 at which data is read or written, the manipulated variable C1 receives an input of a reference value RF and a position of a current particular head 17 (simply referred to as a current head position below). The manipulated variable C1 outputs the position error signal PE obtained by subtracting the current head position from the reference value RF to the MA controller 1311 and the manipulated variable C3.

The MA controller 1311 receives an input of the position error signal PE. The MA controller 1311 outputs the MA control signal to the MA model 1312 and the manipulated variable C2. The MA model 1312 receives an input of the MA control signal, and outputs the estimated MA drive signal to the manipulated variable C3. The compensator 1331 receives an input of the calculated estimated acceleration Ah of the particular head 17, and outputs the estimated acceleration signal to the manipulated variable C2. The manipulated variable C2 receives an input of the MA control signal and the estimated acceleration signal. The manipulated variable C2 outputs to the MA notch 1313 the MA control signal obtained by suppressing an influence of vibration of a specific frequency caused by adding the estimated acceleration signal to the MA control signal. The MA notch 1313 receives an input of the MA control signal, and outputs the MA drive signal to the MA 1314. The MA 1314 is driven based on the MA drive signal, and outputs a position of the MA (referred to as the MA position below) to the manipulated variable C4.

The manipulated variable C3 receives an input of the position error signal PE and the estimated MA drive signal. The manipulated variable C3 outputs to the VCM controller 1321 the position error signal PE to which the estimated MA drive signal has been added. The VCM controller 1321 receives an input of the position error signal PE, and outputs the VCM control signal to the VCM notch 1322. The VCM notch 1322 receives an input of the VCM control signal, and outputs the VCM drive signal to the VCM 1323. The VCM 1323 is driven based on the VCM drive signal, and outputs a position of the VCM 24 (referred to as the VCM position below) to the manipulated variable C4. The manipulated variable C4 outputs a target position (current head position) of the particular head 17 obtained by adding the MA position to the VCM position.

According to the present embodiment, the magnetic disk device 1 includes the sensor SR1 and the sensor SR2 which are provided to the actuator assembly 22, the VCM 24 (VCM 1323), the MA (MA 1314) and the control unit 130. The sensor SR1 is located in the second direction Z and in the direction opposite to the sensor SR2 with respect to the node NV of vibration of the actuator assembly 22 in a case where the magnetic disk device 1 vibrates at a specific frequency. By disposing the sensors SR1 and SR2 in this way, it is possible to directly detect an influence on the heads 17 in the case where the magnetic disk device vibrates at a specific frequency. The control unit 130 calculates the estimated acceleration Ah in the first direction X of the particular head 17 based on the acceleration A1 detected by the sensor SR1, the acceleration A2 detected by the sensor SR2 and Equation (1) to Equation (3). By performing feed-forward input of the calculated estimated acceleration Ah to the MA control system MSY and controlling the MA, the control unit 130 can suppress a positioning error of each head 17 in a case where the magnetic disk device 1 vibrates at a specific frequency such as 4 kHz to 9 kHz in the frequency due to a disturbance such as a sound pressure. Consequently, positioning precision of the magnetic disk device 1 for each head 17 improves.

Next, a magnetic disk device according to a modified example and another embodiment will be described. The same portions as those of the aforementioned embodiment will be assigned the same reference numerals in the modified example and another embodiment, and will not be described.

MODIFIED EXAMPLE

The magnetic disk device 1 according to the modified example differs from the aforementioned embodiment in a configuration of the positioning control system SY.

FIG. 8 is a view illustrating an example of the positioning control system SY of the heads 17 according to the modified example.

The positioning control system SY further includes a compensator 1332 and a manipulated variable C5. The positioning control system SY performs feed-forward input of the estimated acceleration Ah to the VCM control system VSY such as the manipulated variable C2 and the manipulated variable C5 between the VCM notch 1322 and the VCM 1323.

The compensator 1332 generates an estimated acceleration signal. The compensator 1332 includes, for example, a filter which cuts a low frequency component and a high frequency component of the estimated acceleration Ah, and the amplitude component of the operation of the actuator assembly 22 (or the VCM 24), a controller integrator and a constant. The filter is, for example, a bandpass filter, and cuts the low frequency component equal to or less than 1 kHz or 2 kHz, the high frequency component equal to or more than 10 kHz and the amplitude component of the operation of the actuator assembly 22.

The manipulated variable C3 receives an input of the position error signal PE and the estimated MA drive signal. The manipulated variable C3 outputs to the VCM controller 1321 the position error signal PE to which the estimated MA drive signal has been added. The VCM controller 1321 receives an input of the position error signal PE, and outputs the VCM control signal to the VCM notch 1322. The VCM notch 1322 receives an input of the VCM control signal, and outputs the VCM drive signal to the manipulated variable C5. The compensator 1332 receives an input of the calculated estimated acceleration Ah of the particular head 17, and outputs the estimated acceleration signal to the manipulated variable C5. The manipulated variable C5 outputs to the VCM 1323 the VCM drive signal obtained by suppressing an influence of vibration of a specific frequency caused by adding the estimated acceleration signal to the VCM control signal. The VCM 1323 is driven based on the VCM drive signal, and outputs a position of the VCM 24 (referred to as the VCM position below) to the manipulated variable C4. The manipulated variable C4 outputs a target position of the particular head 17 obtained by adding the MA position to the VCM position.

According to the modified example, by performing feed-forward input of the calculated estimated acceleration Ah to the VCM control system VSY and controlling the VCM 24, it is possible to suppress an influence on a positioning error of each head 17 in a case where the magnetic disk device 1 vibrates at a specific frequency. Consequently, positioning precision of the magnetic disk device 1 for each head 17 improves.

Second Embodiment

A magnetic disk device 1 according to the second embodiment differs from the aforementioned embodiment in an arrangement of a sensor SR1 and a sensor SR2.

FIG. 9 is a schematic view illustrating an example of the magnetic disk device 1 according to the second embodiment. FIG. 9 illustrates only components necessary for description.

In the second embodiment, the sensor SR2 is mounted on an inner surface of a control circuit board 90. In addition, the sensor SR2 may be provided on an inner surface side of a bottom wall 12a of a base 12.

According to the second embodiment, the magnetic disk device 1 includes the sensor SR2 on an outer surface side of the bottom wall 12a of the base 12. Hence, the magnetic disk device 1 can easily secure a spacer for disposing the sensor SR2.

In addition, a low density gas (inert gas) such as helium having a lower density than air is sealed in a housing 10. However, the configurations of the aforementioned embodiments and modified example are applicable to normal magnetic disk devices in which the inert gas is not sealed. The normal magnetic disk devices adopt a structure that the upper end opening of the base 12 is blocked by, for example, one top cover instead of two covers of an inner cover 14 and an outer cover 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   an actuator assembly including an actuator block including a rotatable bearing unit;
   a plurality of heads movably supported in a first direction by the actuator assembly and aligned at intervals in a second direction intersecting the first direction;
   a board fixed to a first side surface in the first direction of the actuator block;
   a first sensor provided on the board;
   a second sensor provided on the board at a position different from the first sensor; and
   a voice coil connected to a second side surface intersecting the first side surface of the actuator block, wherein
   a first region of the board is fixed to the actuator block by a first screw and a second region apart from the first region in the second direction of the board is fixed to the actuator block by a second screw,
   the heads extend from the actuator block on an opposite side to the second side surface in a third direction intersecting the first direction and the second direction,
   the first sensor is provided in the first region and is located between the voice coil and the first screw in the third direction, and
   the second sensor is provided at a position apart from the first sensor in the second direction, is provided in the second region, and is located between the voice coil and the second screw in the third direction.

* * * * *